Nov. 14, 1939.                J. BIERMANNS                2,180,192
                PROTECTION OF ALTERNATING CURRENT SYSTEMS
                          Filed Feb. 15, 1939
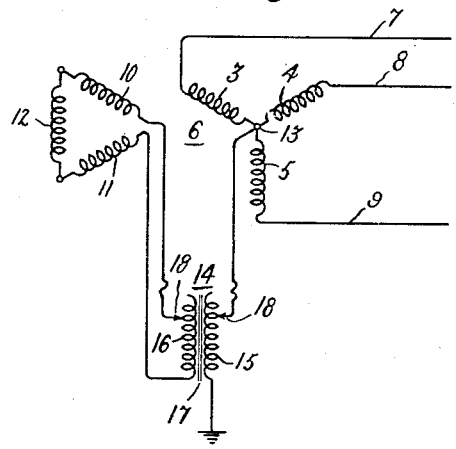
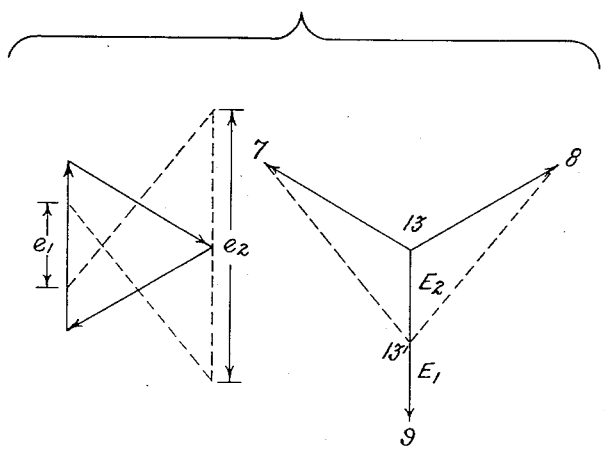
Inventor:
Josef Biermanns,
by Harry E. Dunham
  His Attorney.

Patented Nov. 14, 1939

2,180,192

UNITED STATES PATENT OFFICE 2,180,192

PROTECTION OF ALTERNATING CURRENT SYSTEMS

Josef Biermanns, Berlin-Johannisthal, Germany, assignor to General Electric Company, a corporation of New York Application February 15, 1939, Serial No. 256,525
In Germany May 10, 1938

6 Claims. (Cl. 172—237)

My invention relates to improvements in the protection of alternating current electric systems and more particularly to improvements in the protection of alternating current electric systems of the type in which a fault to ground on one phase conductor of the system substantially increases the voltage to ground of the other phase conductors of the system. More specifically, my invention relates to improvements in the protection of alternating current electric systems by arc suppression with ground fault neutralizers as fundamentally disclosed in United States Letters Patent 1,537,371, issued May 12, 1925, on an application filed by Waldemar Petersen. One object of my invention is to provide an improved earth fault arc suppression protective arrangement which permits a material reduction in insulation requirements of the system neutral points over practical arrangements heretofore known to the art. Other objects of my invention will hereinafter appear in more detail.

The aforesaid patent discloses the suppression of the capacitance current to ground of the ungrounded conductors of an alternating current system upon the occurrence of a ground on one conductor by a suitably proportioned inductive device or ground fault neutralizer which is connected between a neutral point of the system and ground. Upon the occurrence of a ground on one phase conductor, a lagging current flows in the ground fault neutralizer of such a value as effectively to suppress the capacitance current to ground at the grounded point. With this arrangement, the neutral point of the windings of the electrical apparatus, such as transformers, inductive coils, generators, etc., assumes relatively to the remaining windings, such as the secondary windings of transformers, or relatively to the core the normal line to ground voltage of the phase conductors of the system. For very high working voltages, this means a heavy expenditure for insulation. Also, it limits the application of ground fault neutralizers to systems whose neutral points are insulated from ground for at least the line to neutral or star voltage of the system. Since there are many high voltage systems whose transformers have reduced insulation at the neutral, it has not in the past been possible to equip these systems with a ground fault neutralizer because of this reduced insulation.

It is also known to suppress the earth fault charging current in high voltage systems by connecting the neutral point of a system transformer, for example, directly to ground without any inserted inductive device and to so load another polyphase winding of the transformer that the resultant current flowing from the neutral point of the transformer to ground has substantially the order of magnitude of the earth fault capacitance current to ground. In this case the other winding is connected in three-phase installations as a delta winding whose circuit is closed by a suitable inductive device. Such an arrangement is disadvantageous because, in the event of a ground fault, the voltage on the sound phases of the transformer is increased the $$\sqrt{3} \text{ times}$$

In consequence of this, the transformer iron would have to be operated normally at a low flux density. This is inefficient and uneconomical.

In accordance with my invention, favorable conditions for the protection of high voltage systems against ground faults are created by suitably combining the two above mentioned arrangements for suppressing the ground fault current. One way in which this may be done, according to my invention, is to connect a star point of the system, for example the neutral point of a transformer, to ground through inductive means such as an inductance coil which, however, is proportioned for only a part $E_1$ of the star voltage of the system. Further, in accordance with my invention, the system means providing the neutral point, such as the transformer mentioned, has an inductance connected in series relation with a delta connected winding, as in the corner of the delta. In consequence of this, on the occurrence of a ground fault instead of the neutral point being displaced from ground by the whole star voltage, as in an arrangement where the neutral point is grounded directly through the total required inductance, it is displaced by the star voltage reduced by a voltage $E_2$. Accordingly, the neutral point of the transformer need be insulated only for the part voltage $E_1$ while the remainer $E_2$ is borne by the inductance in circuit with the delta connected windings of the transformer.

Thus, according to my invention, the desired operation in case of ground faults is obtained without raising the neutral point to full star voltage relatively to the transformer core or the remaining transformer windings and also there is no excessive increase in the flux density in the cores of the transformer windings associated with the sound or unfaulted phase conductors.

My invention will be better understood from the following description when considered in connection with the accompanying drawing, and its scope will be pointed out in the appended claims.

In the accompanying drawing Fig. 1 illustrates diagrammatically an embodiment of my invention, and Fig. 2 is a vector diagram explanatory of the embodiment of my invention shown in Fig. 1.

Referring now to Fig. 1 of the drawing, the windings 3, 4 and 5 of a power transformer 6 of any suitable type, examples of which are well-known to the art, are star connected to the phase conductors 7, 8 and 9 of a three-phase circuit. The transformer 6 may also have a star connected winding, not shown, to supply another circuit and delta connected windings 10, 11 and 12. In accordance with my invention, the neutral point 13 of the transformer windings 3, 4 and 5 is connected to ground through an inductive means 14. As shown, this means comprises two cooperating inductances such as windings 15 and 16 respectively connected directly between the neutral point 13 and ground and in a corner of the delta connected windings 10, 11 and 12. The cooperative effect between the two windings 15 and 16 may be obtained by having them mutually inductively related on a suitable magnetic core 17, as shown. For purposes of adjustment, these windings may be provided with suitable taps indicated schematically by the sliding arrows 18. The winding 15 of the inductive means 14 is so proportioned that, on the occurrence of a ground on one of the phase conductors 7, 8 or 9, it only partly compensates the earth fault capacitance current at the grounded point. The balance of the compensation is effected by the winding 16 in cooperation with the winding 15 to produce the required amount of lagging current for effectively suppressing the unbalanced capacitance current of the system. Stated in another way, the reactance of the winding 15 alone would be too high to permit sufficient flow of lagging current to suppress the earth fault capacitance current. The effect of the winding 16, however, on the winding 15 is to reduce the reactive effect of the inductance 14 to the point where it will permit sufficient lagging current flow to compensate the earth fault capacitance current. The winding 15 alone could be so proportioned as to overcompensate or pass lagging current in excess of that necessary to suppress the earth fault capacitance current. In this case the winding 16 would be arranged to increase the reactance of the inductive means 14 to such a value that the resultant current permitted to flow in the neutral to ground connection through the winding 15 would be sufficient to suppress the earth fault capacitance current. If the desired ground fault neutralizing action is to be secured on a system with transformers whose windings adjacent their neutral points are not insulated from ground for the full star voltage of the system, then if any transformer of this character is connected to ground through inductive means embodying my invention, every similar transformer of the system must be similarly grounded.

Fig. 2 is a vector diagram illustrating in full lines the voltages in the illustrated transformer windings under normal conditions and by broken lines the voltages under the condition of a ground on the phase conductor 9, for example. Thus on the occurrence of a ground, the neutral point 13 is displaced by the voltage $E_2$ to the position 13' from its normal position to a voltage above ground by the amount $E_1$. The voltages of the other phase conductors 7 and 8 with respect to the displacement of the neutral point, are represented by the vectors 13'—7 and 13'—8. By reason of these changes, there is a corresponding variation in position of the voltage vectors in the delta connected windings 10, 11, and 12 with a voltage $e_1$ on the delta winding 12. In consequence of this change, the winding 16, in series with the delta connected windings 10, 11 and 12 is subjected to a voltage $e_2$. The magnitudes of the voltages $e_1$ and $e_2$ will depend on the relative values of the voltages $E_1$ and $E_2$ but for simplicity in illustration a turn ratio of unity has been assumed. In the vector diagram accordingly vectors $e_1$ and $E_1$ have the same length but $E_2$ is one-third of $e_2$ since the voltage $e_2$ appears across the corner of the delta in which the winding 16 is connected. In consequence of these resulting voltages and the turn ratio of the windings 15 and 16, currents of such magnitude flow in these windings that the resultant reactance of the inductance 14 is such as to provide a lagging current in the ground connection sufficient effectively to suppress the capacitance current at the ground fault. In consequence of this grounding in accordance with my invention, the windings of the transformer have to be insulated adjacent the neutral from other adjacent windings or the core only for the voltage $E_1$. This makes possible a considerable reduction in insulation so that electrical apparatus, especially transformers, can be built economically for the highest voltages and moreover the grounding arrangement can be applied to existing transformers insufficiently insulated at the neutral. Inasmuch as delta-connected windings are generally present in large transformers, they are available for compensating the earth fault capacitance current in accordance with my invention.

In view of the voltage increase on the windings associated with the sound phase conductors, the flux densities in the associated cores are materially increased. This increase in magnetizing current may in some cases lead to the appearance of harmonics, particularly the fifth harmonic in the power circuit. This disadvantage can be obviated, according to my invention, by so selecting the position of the star point and suitably dimensioning the turn ratio of the inductance 14 that the angle between the voltage vectors of the two sound phase conductors assumes a value such that the higher harmonics in these phases neutralize each other. Apart from this, it is also possible to obtain a harmonic wave compensation in the manner of the Hueter effect by suitably dimensioning and adapting the induction coils and transformer windings.

Obviously, for the most efficient compensation of the earth fault current, it is necessary to suitably tune the inductance 14. As will be obvious to those skilled in the art, this can be done either by variation of the air gap in the iron core or by taps on both windings. In the latter case the number of turns of the two windings should be so regulated that the transformation ratio is at least approximately maintained.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States is:

1. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means connected in circuit with said delta connected windings, another inductive means connected in circuit with said star connected windings, said two inductive means providing on the occurrence of a ground on a phase conductor of the system a zero phase sequence lagging current for effectively suppressing the capacitance current to ground at the grounded point, the inductive means in circuit with said star connected windings being so proportioned that on the occurrence of a ground on a phase conductor of the system the voltage to ground of the neutral point of said star connected windings does not exceed said predetermined voltage.

2. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means comprising a winding connected between the neutral point of said star connected windings and ground and a winding connected in series relation with said delta connected windings, said inductive means providing on the occurrence of a ground on a phase conductor of the system a zero phase sequence lagging current for effectively suppressing the capacitance current to ground at the grounded point, the inductive effect of the winding connected between the neutral point of said star connected windings and ground alone being so proportioned that on the occurrence of a ground on a phase conductor of the system the voltage to ground of the neutral point of the star connected windings does not exceed said predetermined voltage.

3. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means comprising two mutually inductively related windings respectively connected between said neutral point and ground and in series relation with said delta connected windings, said inductive means providing on the occurrence of a ground on a phase conductor of the system a zero phase sequence lagging current for effectively suppressing the capacitance current to ground at the grounded point, said inductive means being so proportioned and arranged that on the occurrence of a ground on a phase conductor of the system the voltage to ground of the neutral point of the star connected windings does not exceed said predetermined voltage.

4. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means comprising two mutually inductively related windings respectively connected between said neutral point and ground and in series relation with said delta connected windings, said two windings providing on the occurrence of a ground on a phase conductor of the system a zero phase sequence lagging current for effectively suppressing the capacitance current to ground at the grounded point, and being arranged to limit the voltage to ground of the neutral point of said transformer to a value which does not exceed said predetermined voltage.

5. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, inductive means connected in circuit with said delta connected windings, another inductive means connected between the neutral of said star connected windings and ground, said two inductive means providing on the occurrence of a ground on a phase conductor of the system a zero phase sequence lagging current for effectively suppressing the capacitance current to ground at the grounded point and being arranged to limit the voltage to ground of the neutral point of said transformer to a value which does not exceed said predetermined voltage.

6. In a polyphase alternating current system of the type in which a fault to ground on one phase conductor of the system substantially increases the capacitance current to ground of the ungrounded conductors of the system, a transformer having windings connected in star to the phase conductors of the system and windings connected in delta, said star connected windings being insulated adjacent their neutral point for a predetermined voltage which is materially less than the normal voltage to ground of a phase conductor of the system, a transforming device comprising two windings respectively connected between said neutral point and ground and in series relation with said delta connected windings, said transforming device providing on the occurrence of a ground on a phase conductor of the system a flow of zero phase sequence lagging current in the winding connected between the neutral point and ground for effectively suppressing the capacitance current to ground at the grounded point and having its two windings proportioned to provide a resultant voltage between the neutral point and ground not exceeding said predetermined voltage.

JOSEF BIERMANNS.